United States Patent [19]
Ohno
[11] 3,824,581
[45] July 16, 1974

[54] SIGNAL MAGNITUDE DISPLAY DEVICE FOR CONVERTING AN INPUT ELECTRIC SIGNAL INTO A VISUAL DISPLAY

[75] Inventor: Isamu Ohno, Tokyo, Japan
[73] Assignee: Yokogawa Electric Works, Ltd., Tokyo, Japan

[22] Filed: June 12, 1972
[21] Appl. No.: 261,592

[30] Foreign Application Priority Data
June 26, 1971 Japan .............................. 46-55780

[52] U.S. Cl. ....................... 340/324 R, 340/166 EL
[51] Int. Cl. ........................................ G08b 5/36
[58] Field of Search ..... 340/166 EL, 324 R, 324 M, 340/336

[56] References Cited
UNITED STATES PATENTS

| | | | |
|---|---|---|---|
| 3,258,644 | 6/1966 | Rajchman | 340/166 EL |
| 3,328,790 | 6/1967 | Rhodes | 340/166 EL |
| 3,343,155 | 9/1967 | Pahlavan | 340/366 |
| 3,659,149 | 4/1972 | Fleming | 340/166 EL |
| 3,689,912 | 9/1972 | Dick | 340/166 EL |

*Primary Examiner*—John W. Caldwell
*Assistant Examiner*—Marshall M. Curtis
*Attorney, Agent, or Firm*—Bryan, Parmelee, Johnson & Bollinger

[57] ABSTRACT

An electrically operated, signal magnitude display device of a non-mechanical, compact type suitable to substitute for a panel meter, with the capability of converting an input digital electrical signal into a visual analog display wherein the magnitude of the input signal is to be represented by an appropriate indication of position within the field of the display. The device comprises a display section having a plurality of electrically activatable luminous elements, such as luminous diodes, arranged in a one-dimensional array so that the elements may be independently activated to luminesce and thereby serve to visually define an incrementally variable position within the array. An electrical circuit, interconnecting with the luminescent element terminals through respective intersecting common groups of terminals in a matrix circuit, responds to the input signal and selects the specific luminous element positioned in the array to correspond to the magnitude of the input signal. In a practical example, the electrical circuit receives, e.g., two digits of a binary coded decimal input signal and converts them to two decimal signals gating two intersecting groups of ten terminals in the matrix circuit to form an activation circuit through the one luminescent element whose terminals appear in the two groups.

5 Claims, 13 Drawing Figures

SIGNAL MAGNITUDE DISPLAY DEVICE FOR CONVERTING AN INPUT ELECTRIC SIGNAL INTO A VISUAL DISPLAY

BACKGROUND OF THE INVENTION

1. Field of the Invention

The field of the present invention relates to display devices for effecting analogic display in the manner of a panel meter. More particularly, it relates to a display device in which an input electrical signal, either an analog signal or a digital signal, is converted to a visually recognizable selected position within the field of the display to correspond to the magnitude represented by the input signal.

2. Description of the Prior Art

Techniques of analogically displaying electrical quantities as known in the prior art may be broadly classified into two: a mechanical technique wherein an electrical quantity is displayed by the mechanical position of a pointer or the like as in a d'Arsonval meter, and an electronic technique wherein an electric quantity is displayed by a beam position on a Braun tube as in a Braun tube oscillograph.

Disadvantageously, however, the former technique has mechanical problems of friction and hysteresis and is incapable of attaining accurate indications over a long term, while the latter technique calls for very bulky and expensive equipment.

SUMMARY OF THE INVENTION

The principal object of the present invention is to realize with a simple construction and at low cost a display device which has no mechanical moving parts and accordingly provides accurate indications over a long term.

Another object of the present invention is to realize a display device with a display section which may be constructed in a flat, easily mounted configuration, and wherein any electric circuit section for driving it may be physically separated, so that mounting onto a panel face and handling are facilitated.

Still another object of the present invention is to realize a display device which may be adapted to display two or more signals simultaneously or in sequence.

According to the invention, the display device converts an input electrical signal, such as a binary coded decimal signal, into a visual analog display wherein the magnitude of the input signal is represented by an indication of position within the field of the display, for example, an indication of a particular position (such as midway, or 87 units) along a line of display marked in units of magnitude. The display device comprises a display section having a plurality of electrically activatable luminous elements arranged in a one-dimensional array so that the elements may be independently activated to luminesce and thereby serve to visually define incremental positions within the array. The display section is driven by electric circuit means responsive to said input signal for selecting the specific luminous element positioned in the array to correspond to the magnitude of the input signal and for activating the selected element to cause it to emit light and thereby indicate the magnitude of the input signal by its position in the array.

Other objects, aspects and advantages of the invention will be pointed out in, or apparent from, the detailed description hereinbelow, considered together with the following drawings.

DESCRIPTION OF THE PREFERRED EMBODIMENTS

Figure 1:
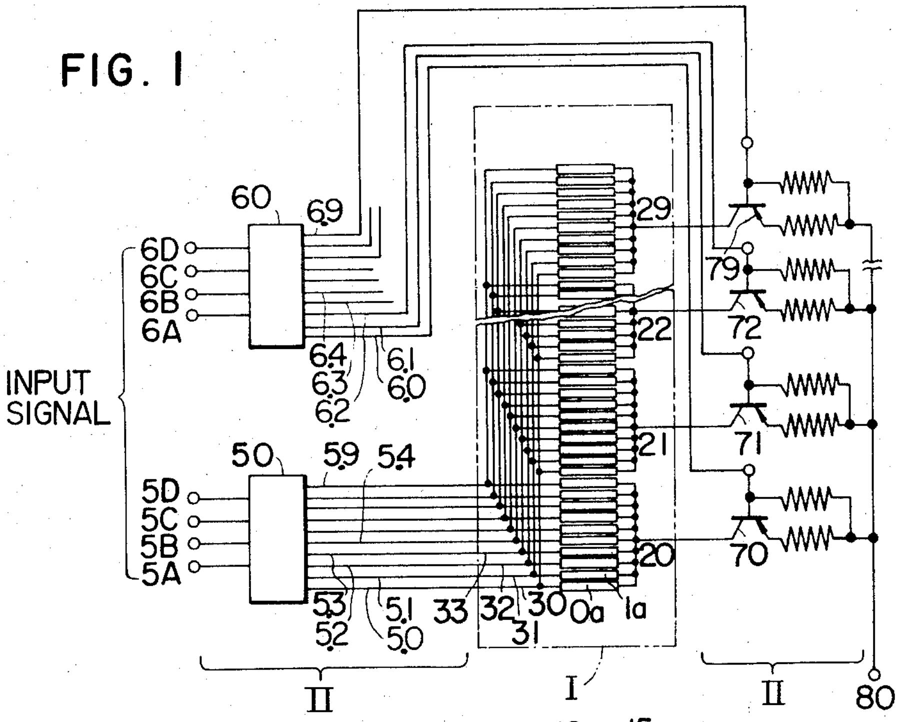
FIG. 1 is a circuit diagram showing electrical connections in one embodiment of the present invention.
Figure 2:
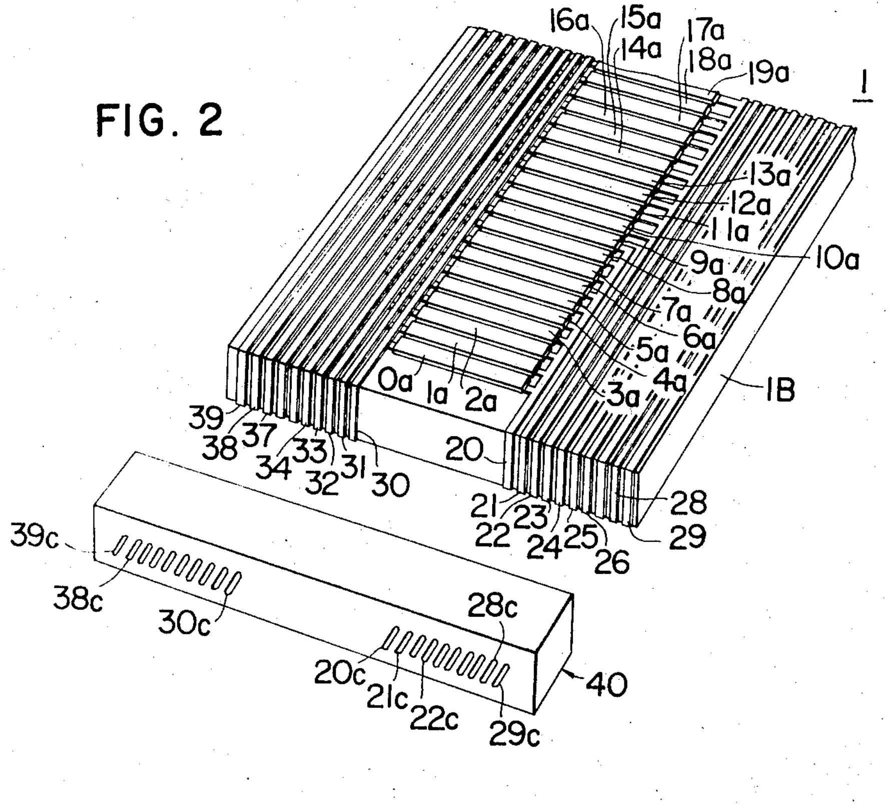
FIG. 2 is a perspective view showing, in enlarged scale, the display section of the device of FIG. 1.

Referring to FIGS. 1 and 2, the display device comprises a display section I and an electric circuit section II for driving the display section. In the display section I, the numerals 0*a*, 1*a*, 2*a*, 3*a*. . . respectively indicate luminous diodes which are arranged in a one-dimensional array and connected to luminesce independently. The luminous diodes have faces shaped, as in the illustrated example, as elongated rectangles and the respective diodes are arranged with their faces side-by-side in a row on, for example, a glass substrate or base 1B. The diodes number, for example, 100, providing an incremental resolution of 1/100 of the whole scale of the display. Numerals 20 – 29 and 30 – 39 represent electrically independent lead wires formed, for example, on the glass base 1B by printed circuit wiring techniques. As shown in FIG. 2, respective lead wires 20 – 29 and 30 – 39 are led for external connection by a multi-connector 40 to an end face of the glass base 1B. The multiconnector 40 has a socket adapted to be coupled with the end face of the glass base 1B, and connection pins 20C – 29C and 30C – 39C to which wires from the electric circuit section II are connected.

The luminous diodes have their terminals connected in an intersecting matrix arrangement to the lead wires 20 – 29 and 30 – 39 so that the specific ones of the diodes may be selected and activated to luminesce in response to signals from the electric circuit section II. More specifically, the luminous diode 0a has one (right) terminal connected to the lead wire 20 and the other (left) terminal connected to the lead wire 30, and the luminous diode 1a has one (right) terminal connected to the lead wire 20 and the other (left) terminal to the lead wire 31. Similarly, the luminous diode 10*a* has one (right) terminal connected to the lead wire 21 and the other (left) terminal to the lead wire 30, and the luminous diode 11*a* has one (right) terminal connected to the lead wire 21 and the other (left) terminal to the lead wire 31. Accordingly, in this embodiment, ten of the adjacent right-hand terminals of the luminous diodes are connected in one group and the ten groups so formed are successively connected to the lead wires 20, 21, 22 . . . On the other hand, the left-hand terminals of the luminous diodes have every tenth one connected together in a group and the ten groups so formed are successively connected to the lead wires 30, 31, 32, . . .

In the electrical circuit section II, numerals 50 and 60 designate BCD (binary code decimal) to decimal decoders, while numerals 70, 71, 72, . . . designate transistor switches driven by the output of the decoder 60. Input terminals 5A - 5D and 6A - 6D of the decoders 50 and 60 are supplied, in parallel, with input signals in the form of BCD code signals. In the example of FIGS. 1 and 2, decoder 50 takes charge of the input signal component representing the decimal digit with the order of 1, while the decoder 60 takes charge of the input signal component representing the decimal digit with the order of 10. The output terminals 5.0, 5.1, 5.2, . . . of the decoder 50 in charge of decimal digits with order of 1 are connected respectively to the lead wires 30, 31, 32, . . . while the output terminals 6.0, 6.1, 6.2, . . . of the decoder 60 in charge of decimal digits with order of 10 are connected respectively through the bases of the transistors 70, 71, 72 . . . whose collectors are connected to the lead wires 20, 21, 22, . . . As illustrated, the emitters of transistors 70, 71, 72 . . . are connected through resistors to a power source terminal 80.

Figure 3:
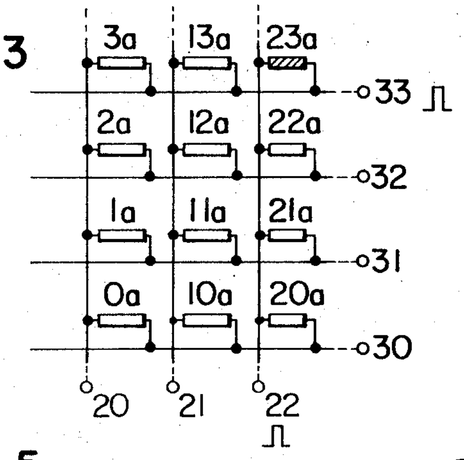
FIG. 3 is a partial circuit diagram showing schematically the electrical connection of the luminous elements in the device in FIG. 1.

FIG. 3 illustrates schematically a portion of the circuitry by which specified ones of the luminous diodes 0*a*, 1*a*, 2*a*, . . . are selected for activation. As shown, diodes 0*a*, 1*a*, 2*a*, . . . are electrically connected through their two end terminals at positions at which the lead wires 20, 21, 22, . . . (column lines) and the lead wires 30, 31, 32, . . . (row lines) intersect, and thus the electric circuit interconnecting the luminescent diodes may be seen to constitute a matrix circuit.

An example of the operation of the display device of FIGS. 1–3 is as follows. Input signals are fed to the decoders 50 and 60 in parallel in the form of BCD code signals, and are transformed into decimal signals (i.e., an output through one of the ten output terminals 5.0 to 5.9 or 6.0 to 6.9) by the decoders 50 and 60. Let it now be supposed as an example that a code signal (1100) is fed to the input side of the decoder 50 in charge of decimal digits of the first order, while (0100) is fed to the input side of the decoder 60 in charge of decimal digits of the second order. In this case, an output signal is transmitted through the output terminal 5.3 of the decoder 50 to the lead wire 33, to render the lead wire 33 conductive. In effect, decoder 50 acts as a selective gating circuit to gate into conductivity the particular lead wire corresponding to the input signal. In addition, an output gating signal is transmitted through the output terminal 6.2 of the decoder 60, to render the transistor 72 conductive, and to cause the lead wire 22 to be thus gated into conductivity. When the lead wire 22 and the lead wire 33 are thus turned "on," only the luminous diode 23*a* is selected for activation, as is apparent from FIG. 3.

Figure 4:
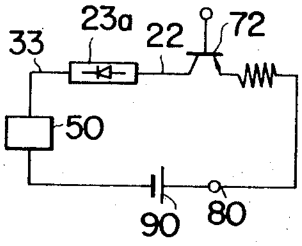
FIG. 4 is a circuit diagram illustrating the circuitry for activating the specific luminous element selected for activation.

The circuit for activating the selected luminous diode 23*a* accordingly becomes as shown in FIG. 4. A current flows from a power source 90 through the conducting transistor 72, lead wire 22, luminous diode 23*a*, lead wire 33 and conducting decoder 50, so that the luminous diode 23*a* luminesces and visually defines a position within the display field.

In this manner, only a specified one of a plurality of luminous diodes, arranged in a one-dimensional array, luminesces at an incremental position corresponding to the magnitude of, and in response to, the input signals applied in parallel to the decoders 50 and 60. The magnitudes of the input signals may be therefore visually recognized from the position of the luminesence in the display.

For simplicity, an array of 100 diodes has been described. Resolution of 1/100 of the display scale is therefore possible. By further increasing the number of the luminous diodes, it is possible to make the resolution of the signal display higher. Also, by increasing the number of gating stages to add to the order of the matrix circuit, any number of BCD signals may be used to select a digitally related luminous diode. For example, three BCD signals with a three-fold AND gating circuit would select one from 1,000 diodes.

Where the input signals to be displayed are analog signals, the display may be derived by applying the analog signal to an analog-to-digital converter, andd applying the digital signals so obtained either first to decoders such as 50 and 60 or directly to the lead wires 20 – 29 and 30– 39.

The foregoing embodiment is described in terms of BCD coded input signals, and in terms of the arrangement of diode terminals into decimal groups of ten. It is apparent, however, that other inputs, as in hexadecimal code, and other groupings of luminescent elements in any number base, may instead be used.

Similarly, while luminous diodes having faces shaped as elongated rectangles are described, and preferred, for their visibility and resolving ability without occupying a great deal of space, they instead may be of other shapes. In addition, two or more luminous diodes connected in series may be employed in place of each luminous diode in the foregoing description. The luminous diodes may also be replaced with other luminous elements such as electroluminescent (EL) ones.

Figures 5, 6:
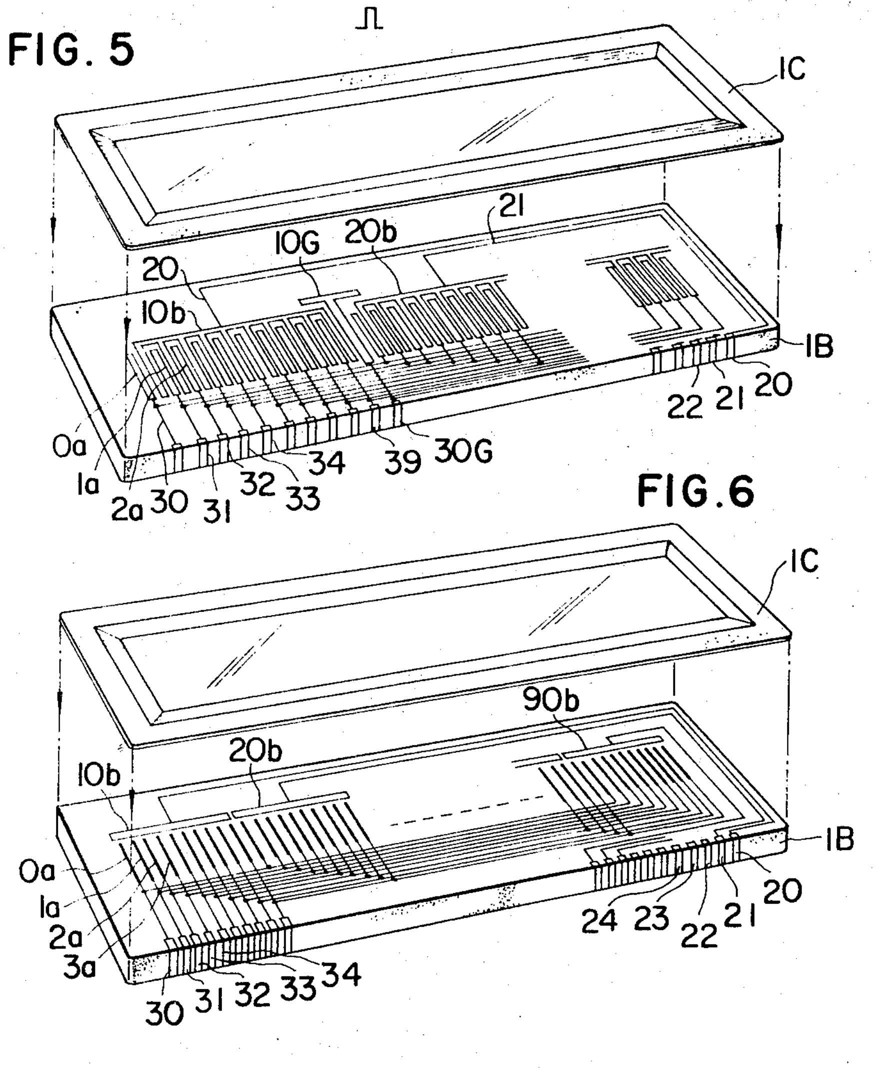
FIGS. 5 to 7 are respective views showing different constructions of the display section for use in the present invention.
Figure 7:
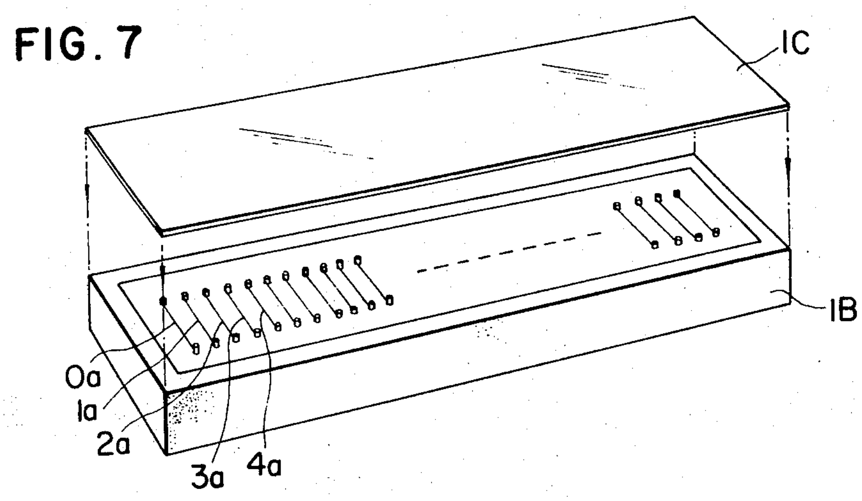

FIGS. 5 to 7 are views showing other constructions of the display section I.

Shown in FIG. 5 is a display tube which is manufactured by thick-film IC technology. In the figure, 1B designates a substrate made of glass, 0*a*, 1*a*, 2*a*, . . . are cathode electrodes which are consecutively arranged in a one-dimensional array on the surface of the substrate 1B, and 10*b*, 20*b*, . . . are anode electrodes which are constructed in the shape of combs, with teeth extending from a common spine. The anode electrodes are arranged so that the cathode electrodes are interposed between adjacent teeth of the comb-shaped electrodes with a slight spacing from said teeth. The cathode electrodes 0*a*, 1*a*, 2*a*, . . . are connected to lead wires 30, 31, 32, . . . while the anode electrodes 10*b*, 20*b*, . . . are connected to lead wires 20, 21, . . . Numeral 10G (similar parts 11G, 12G, and so on are not shown) represents a shield electrode, which is placed between the adjacent anode electrodes and which is connected at one end to a lead wire 30G (31G, etc., are not shown). The electrodes and lead wires are formed on base 1B by known techniques used in making thick-film integrated circuits. A glass covering panel 1C is applied over the glass substrate 1B and made integral therewith, to seal off the anode and cathode electrodes and thus form a tube.

The principle of luminesence of the display tube thus constructed is classified into the cold cathode glow discharge type. More specifically, for particular combinations of air pressure within the glass tube, type of cathode electrode and anode electrode, and value of DC voltage applied acorss the electrodes, there will result an electric discharge between the selected cathode electrode and anode electrode, and such discharge will be observed as a line of light. Accordingly, the magnitude of the input signal will be displayed by the position of the line of light which emanates from the selected electric discharge.

Shown in FIG. 6 is a display section which is constructed using the principles of neon display tubes. Numerals 0*a*, 1*a*, 2*a*, . . . designate cathode electrodes, which are one-dimensionally arranged on the surface of a substrate 1B. Anode electrodes 10*b*, 20*b*, . . . are arranged so as to oppose the ends of a group of ten of the cathode electrodes. The cathode electrodes are connected at their other ends to lead wires 30, 31, . . . while the anode electrodes are connected to lead wires 20, 21, 22, . . . A glass cover panel 1C is applied to the glass substrate 1B and made integral therewith to form a sealed tube. Neon gas, argon gas or the like is sealed inside the glass tube in contact with the electrodes.

With the display tube constructed as in FIG. 6, specific cathode and anode electrodes are selected in response to an input signal in substantially the same manner as in the display tube shown in FIG. 5, to cause electric discharge to occur between the two selected electrodes. The gas in the vicinity of the particular cathode electrode emits light, and thus the magnitude of the input signal is usually displayed by the corresponding position of the light emission.

The display unit illustrated in FIG. 7 employs filaments 0*a*, 1*a*, 2*a*, . . . as light elements. The electrical connection of the respective filaments (not shown) is substantially the same as in the display section shown in FIG. 1. A specific filament is selected, and a voltage is applied thereto, whereby the particular filament emits incandescent radiation to effect the signal display.

Figure 8A:
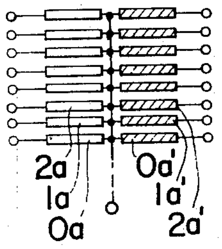
FIGS. 8A to 8C are schematic views illustrating different examples of arrays of the luminous elements in the display section.
Figure 8B:
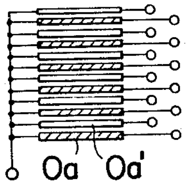
Figure 8C:
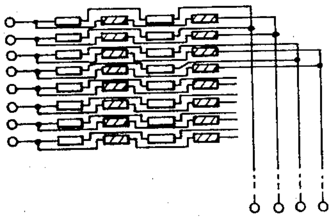

FIGS. 8A, 8B and 8C illustrate further examples of arrays of the luminous elements in the display section, utilizing luminescent elements providing different colors of emitted light. Different emission colors are available, for example, in case of luminous diodes, with the materials GaAlAs, GaAsP, GaP, etc., which are capable of emitting red and green light.

FIG. 8A shows an arrangement in which luminous elements O*a*, 1*a*, . . . and 0*a'*, 1*a'*, . . ., which have different colors of emitted light, are arranged on a substrate so as to constitute two side-by-side one-dimensional arrays. In the embodiment shown in FIG. 8B, luminous elements 0*a*, 1*a*, . . . and 0*a'*, 1*a'*, . . ., which have different colors of emitted light, are alternated so as to form two interleaved subarrays together forming a single one-dimensional array. In the embodiment shown in FIG. 8C, four sets of luminous elements which each differ in the color of emitted light are arranged in four side-by-side arrays so as to provide a different color at every array.

Figure 10:
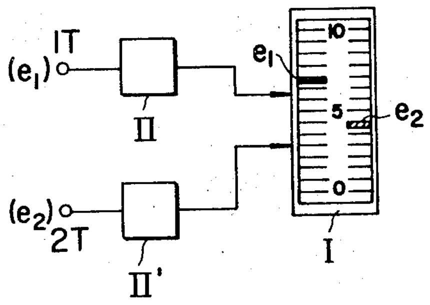

FIG. 10 illustrates an example of use of a display section of the type shown in FIG. 8A in which luminous elements of different colors of emitted light are arranged in two arrays. Two input signals $e_1$ and $e_2$ are applied to the inputs of electric circuits II and II', and both input signals are simultaneously displayed in different colors in the display section I. The indicia "0," "5" and "10" are affixed to the display section I to show in units of magnitude the position of the displaying elements. A practical application for such a display is in a deviation indicating instrument in which, e.g., $e_1$ is a signal from a process monitoring instrument and $e_2$ is a setpoint signal.

When two or more sorts of luminous elements differing in color of emitted light are used in this way, two or more signal quantities may be simultaneously or intermittently displayed in different colors.

Figure 9A:
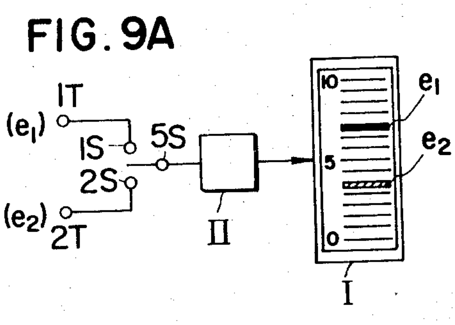
FIGS. 9A, 9B and 10 are schematic diagrams showing additional examples of the display device according to the present invention.
Figure 9B:
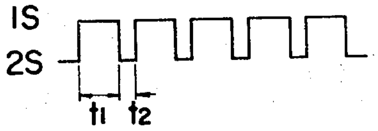

Two or more sorts of signal quantities can also be displayed in a display section having luminous elements emitting in a single color, as illustrated in FIG. 9. As shown in FIG. 9A, two input signals $e_1$ and $e_2$, respectively applied to input terminals 1T and 2T, are sequentially applied to an electric circuit section II by a switch 5S, and thus the display section I displays the two input signals on the same face. If the switch 5S is alternately connected to contact 1S and to contact 2S for differing periods of time $t_1$ and $t_2$ as illustrated in FIG. 9B, the indicated value of the input signal $e_1$ gives forth a bright light, while that of the input signal $e_2$ gives forth a dimmer light, and the two input signals may be discriminated.

As explained above, the present invention is characterized by a plurality of luminous elements arranged in a one-dimensional array, a specific one of the luminous elements being selected in association with the magnitude of an input signal, so that the magnitude of the input signal is known from the position of light emission. Therefore, no mechanical moving parts are involved, and accordingly a display device may be realized which effects accurate indications over a long term. In addition, since the display section may be made flat, a display device may be realized for which handling and mounting to a panel face is easy.

Although specific embodiments of the invention have been disclosed herein in detail, it is to be understood that this is for the purpose of illustrating the invention, and should not be construed as necessarily limiting the scope of the invention, since it is apparent that many changes can be made to the disclosed structures by those skilled in the art to suit particular applications.

I claim:

1. A signal magnitude display device for converting two separate input electrical signals each comprising first and second component signals into a visual display wherein the magnitudes of the two input signals are to be represented by two distinguishable indicated positions in the display, comprising a display section having a plurality of electrically activatable luminous elements having two terminals and arranged in an array so that the elements may be independently activated to luminesce and thereby serve to visually define incremental positions within the array, and electric circuit means responsive to said input signals for selecting specific luminous elements positioned in the array to correspond to the magnitudes of the input signals and for activating the selected elements to cause them to emit light and thereby indicate the magnitude of the input signals by their position in the array, said electric circuit means comprising a matrix circuit connecting the luminous elements at one terminal into first groups each consisting of at least two of said element terminals, and connecting the other terminals of said elements into second groups, each consisting of at least two of said other terminals, no more than one of which is associated with an element in any one of the first groups, said first component of an input signal selecting one of the first groups of terminals, and the second component of an input signal selecting one of the second groups of terminals to thereby complete a circuit through the one specific luminous element with terminals in both groups, and means for separately applying the two separate input signals to the display section to activate two specific luminous elements therein.

2. A display device as claimed in claim 1 wherein said display section comprises luminous elements arranged in first and second one-dimensional arrays, the second one-dimensional array being adjacent to the first array and the elements of the second array emitting in a different color of light from the elements in said first array, and wherein the means for separately applying the input signals comprises means for applying one input signal to said first array of elements and the other input signal to said second array of elements, whereby the magnitudes of the two input signals are displayed in different colors in the display section.

3. A display device as claimed in claim 1 wherein said means for separately applying the input signals comprises means in the electric circuit means arranged to sequentially respond to said two input signals, whereby separate luminous elements will be independently selected and activated to indicate the magnitudes of the two input signals.

4. A display device as claimed in claim 3, wherein said luminous elements have luminances dependent upon the average period of time of activation, and wherein said electric circuit means sequentially responds to said two input signals for respectively different periods of time, whereby said two input signals are represented by elements with different luminances.

5. A display device as claimed in claim 1 wherein said display section further comprises indicia affixed adjacent said array of elements to signify the magnitudes corresponding to the positions of the elements.

* * * * *